(12) United States Patent
Hill et al.

(10) Patent No.: US 8,794,217 B1
(45) Date of Patent: Aug. 5, 2014

(54) COHERENT-STRUCTURE FUEL TREATMENT SYSTEMS AND METHODS

(71) Applicant: Thrival Tech, LLC, Ashland, OR (US)

(72) Inventors: Garrett Hill, Ashland, OR (US); Scott Lazar, Ashland, OR (US); Dustin Stonehouse, Ashland, OR (US); Justin Tombe, Ashland, OR (US)

(73) Assignee: Thrival Tech, LLC, Ashland, OR (US)

( * ) Notice: Subject to any disclaimer, the term of this patent is extended or adjusted under 35 U.S.C. 154(b) by 0 days.

(21) Appl. No.: 13/870,106

(22) Filed: Apr. 25, 2013

Related U.S. Application Data

(60) Provisional application No. 61/762,099, filed on Feb. 7, 2013.

(51) Int. Cl.
*F02B 51/00* (2006.01)
*F02M 27/00* (2006.01)
*F02G 5/00* (2006.01)

(52) U.S. Cl.
USPC ........... 123/545; 123/536; 123/537; 123/538; 123/539; 123/543; 123/544; 123/557

(58) Field of Classification Search
USPC ................................. 123/536–539, 543–557
See application file for complete search history.

(56) References Cited

U.S. PATENT DOCUMENTS

| | | | |
|---|---|---|---|
| 2,991,238 A | 7/1961 | Phillips et al. | |
| 3,150,483 A * | 9/1964 | Mayfield et al. | 60/202 |
| 3,866,585 A * | 2/1975 | Kopa | 123/442 |
| 4,106,453 A * | 8/1978 | Burley | 48/189.3 |
| 4,976,248 A | 12/1990 | Rowe | |
| 5,205,264 A * | 4/1993 | Hoffman, Sr. | 123/555 |
| 5,637,226 A * | 6/1997 | Adam et al. | 210/695 |
| 5,794,601 A * | 8/1998 | Pantone | 123/538 |
| 6,363,716 B1 | 4/2002 | Balko et al. | |
| 6,548,752 B2 | 4/2003 | Pavlenko et al. | |
| 7,469,688 B2 * | 12/2008 | Jonson et al. | 123/531 |
| 7,487,764 B2 * | 2/2009 | Lee | 123/538 |

(Continued)

FOREIGN PATENT DOCUMENTS

| | | |
|---|---|---|
| WO | 2004/063628 A2 | 7/2004 |
| WO | 2005/003616 A1 | 1/2005 |
| WO | 2010/033171 A1 | 3/2010 |

OTHER PUBLICATIONS

Lampton, C., "How Exhaust Heat Recovery and Recirculation Works", HowStuffWorks, A Discovery Company, http://www.howstuffworks.com/fuel-efficiency/hybrid-technology/exhaust-heat-recovery-recirculation.htm, screen capture Nov. 21, 2012.

(Continued)

*Primary Examiner* — Lindsay Low
*Assistant Examiner* — Tea Holbrook
(74) *Attorney, Agent, or Firm* — Fish & Tsang LLP

(57) ABSTRACT

Fuel efficiency in a combustion engine is increased by treating the fuel in a reaction chamber prior to delivering the fuel into the combustion chamber of the engine. The method includes the step of entraining a stream of exhaust gas to travel upstream through the reactor chamber in a first flow pattern. The method also includes the step of entraining a stream of fuel to travel downstream through the reactor chamber in a second flow pattern, where at least one of the first and second flow patterns comprises a structured turbulent flow.

26 Claims, 6 Drawing Sheets

(56) References Cited

U.S. PATENT DOCUMENTS

| | | |
|---|---|---|
| 7,862,302 B2 | 1/2011 | Harman |
| 7,951,288 B2 * | 5/2011 | Allen .............................. 208/15 |
| 8,291,891 B2 | 10/2012 | Alger, II et al. |
| 2005/0193994 A1 * | 9/2005 | Rigney ........................ 123/549 |
| 2007/0137191 A1 * | 6/2007 | Kweon et al. ................ 60/320 |
| 2009/0031703 A1 * | 2/2009 | Lee et al. ...................... 60/275 |
| 2009/0038591 A1 | 2/2009 | Lee et al. |
| 2009/0114168 A1 * | 5/2009 | Lee et al. ......................... 123/3 |
| 2011/0027728 A1 * | 2/2011 | Milosavljevic .................. 431/2 |
| 2011/0108011 A1 * | 5/2011 | Peterson ....................... 123/557 |
| 2011/0174277 A1 * | 7/2011 | Socolove ...................... 123/538 |
| 2011/0226221 A1 * | 9/2011 | Roland ......................... 123/557 |
| 2012/0223643 A1 | 9/2012 | Haramein |
| 2012/0266594 A1 | 10/2012 | Christmann |
| 2012/0285426 A1 | 11/2012 | Hayman et al. |

OTHER PUBLICATIONS

"Turbocharger", Wikipedia, the free encyclopedia, http://en.wikipedia.org/wiki/Turbocharger, screen capture Nov. 21, 2012.

\* cited by examiner

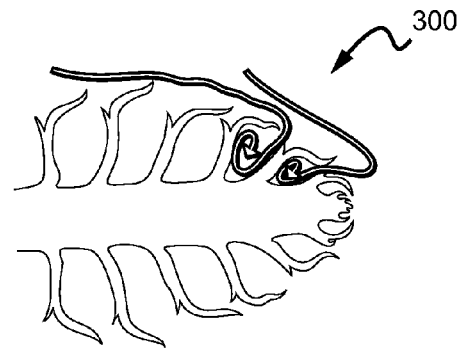
FIG. 3A
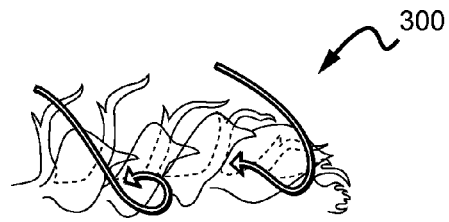
FIG. 3B
FIG. 3C
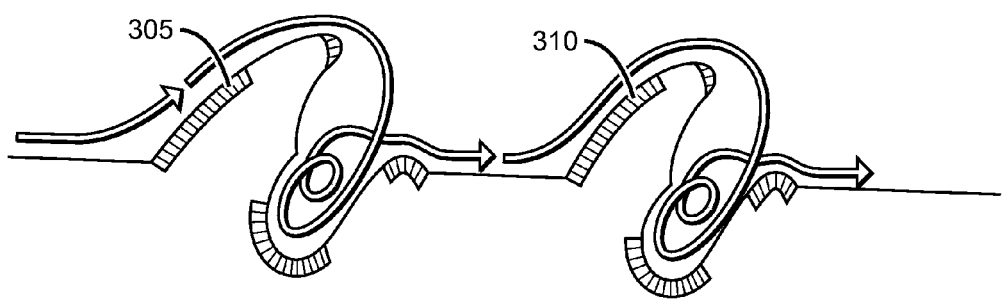
FIG. 4
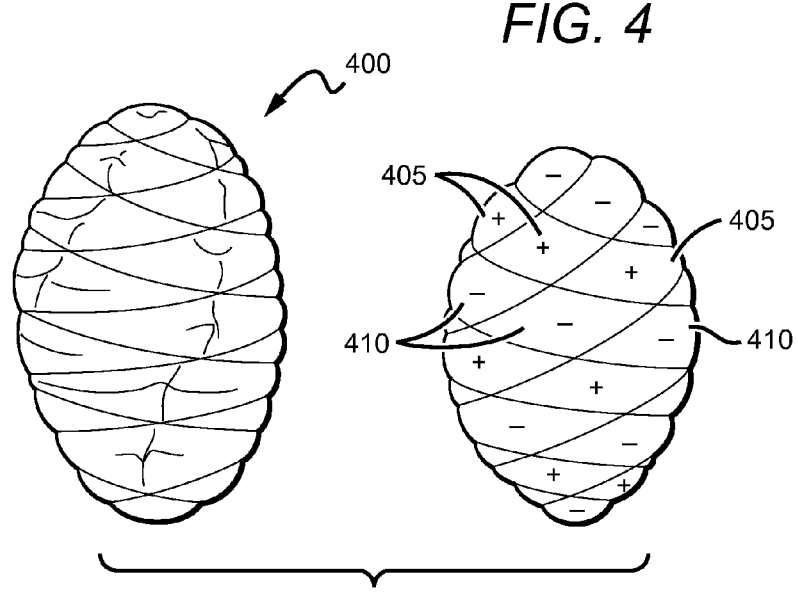

COHERENT-STRUCTURE FUEL TREATMENT SYSTEMS AND METHODS

This application claims priority to U.S. Provisional Application No. 61/762,099, filed Feb. 7, 2013. This and all other extrinsic materials discussed herein are incorporated by reference in their entirety.

FIELD OF THE INVENTION

The field of the invention is combustion engine system, more specifically, a fuel treatment system for a combustion engine.

BACKGROUND

The following description includes information that may be useful in understanding the present invention. It is not an admission that any of the information provided herein is prior art or relevant to the presently claimed invention, or that any publication specifically or implicitly referenced is prior art.

Internal combustion engines have been around since early nineteenth century. Even with the increasing popularity of hybrid and electric cars, internal combustion engines are still the main driving force of a majority of today's vehicles.

In an internal combustion engine (ICE) system, a mixture of fuel (e.g., gasoline) and gas (e.g., oxygen) is injected into a combustion chamber. Upon ignition, the mixture combusts and produces gases (usually contains steam, carbon dioxide, and other chemicals) in very high temperature. As the gases expand due to high temperature, they generate a force that drives the moving parts (e.g., pistons) of the engine. In short, the ICE system produces power by transferring chemical energy that is stored in the fuel-air mixture to thermal energy.

However, even though ICEs have been in existence for a long period of time, they have never attained high efficiency levels. In fact, most ICEs in cars being produced today are only about 25% to 30% efficient (total thermal efficiency). Inefficiency of an ICE is usually caused by incomplete combustion of fuel, which also results in emission of harmful gases such as carbon dioxide and soot. As such, improvements to the ICE's efficiency would reduce both fuel consumption and air pollution.

Efforts have been made in the past to improve the efficiency of ICE systems. Several patent literatures, including U.S. Pat. No. 8,291,891 to Francis et al. entitled "EGR System with Dedicated EGR cylinders", filed Jun. 17, 2008, U.S. patent publication 2012/0266594 to Christmann entitled "Internal Combustion Engine", filed Dec. 14, 2010, and U.S. patent publication 2012/0285426 to Hayman et al. entitled "Intake Manifold Assembly for Dedicated Exhaust Gas Recirculation", filed May 10, 2011 and others, disclose the use of exhaust gas recirculation (EGR) techniques to reduce loss of thermal energy and to reduce formation of harmful gases within the combustion system.

In a more sophisticated effort, U.S. Pat. No. 7,487,764 to Lee entitled "Pre-ignition Fuel Treatment System", filed Feb. 21, 2008 discloses a pre-ignition fuel treatment system that improves combustibility and reduction of by-products produced by cracking and ionizing the fuel in a reactor vessel before entering into the combustion chamber. In addition, Lee further discloses the use of high temperature, high pressure environment of the engine's exhaust gases to create a reaction zone in which the hydrocarbon molecules of the fuel are cracked.

However, even with EGR and pre-ignition fuel treatment techniques, the efficiency of ICE has still yet to reach an optimal level. Thus, there is still a need to improve on existing ICE systems to further improve efficiency and reduce emission of harmful by-products.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods in which a fuel is being treated before ignition in a combustion engine in order to improve efficiency of the engine. In one aspect of the invention, a pre-ignition fuel treatment system for an engine is presented. The system includes a reactor that passes a stream of the exhaust gas past a stream of the fuel. The reactor includes a first structure that entrains the fuel stream to travel in a first flow pattern. The reactor also includes a second structure that entrains the exhaust gas stream to travel in a second flow pattern, wherein at least one of the first and second flow patterns comprises a coherent-structured turbulence.

In some embodiments, the first structure of the pre-ignition fuel treatment system includes a wave guide that enables the fuel stream to travel in the first flow pattern. The wave guide has several characteristics. First, the wave guide has a surface topology comprising a pattern of features. The pattern of features can include features selected from the group of features including: bumps, dimples, cavities, ridges, grooves, and wedges.

In some embodiments, the pattern of features in the surface topology is configured to induce a rotating movement within the first flow pattern. In addition, the surface topology of some embodiments is configured to induce micro-rotations of the fuel stream within the first flow pattern.

The wave guide of some embodiments also has a shape. The wave guide's shape can be a rod, an egg, a sphere, or an ellipsoid. In addition, the wave guide can also have a surface catalyst that is selected from the group of elements consisting of iron (Fe), titanium (Ti), nickel (Ni), palladium (Pd), platinum (Pt), Copper (Cu), Zinc (Zn), and Chromium (Cr). Also, the surface topology in some embodiments defines several scales that are disposed in a coniferous ovulate cone pattern.

In some embodiments, the wave guide also has a core that includes at least a magnetic material or a diamagnetic material.

In addition to the wave guide, the first structure also includes a housing. In some embodiments, the housing has an inlet and an outlet, and, at least one of the inlet and the outlet has a flow form with phi-based proportions and dimensions. In some embodiments, the inner wall of the housing also has a surface topology comprising a pattern of features that are selected from the group consisting of bumps, dimples, cavities, ridges, grooves, and wedges. Also, either the inner wall or the outer wall (or both) of the housing has a surface catalyst that includes at least one of the element selected from the group consisting of iron (Fe), titanium (Ti), nickel (Ni), palladium (Pd), platinum (Pt), Copper (Cu), Zinc (Zn), and Chromium (Cr).

The second structure of some embodiments also has a housing. The housing of the second structure includes an inlet and an outlet, and either the inlet or the outlet (or both) of the housing has flow form with phi-based proportions and dimensions. In some embodiments, the inner wall surface of the second structure's housing has a surface topology that entrains the exhaust gas stream to travel within the housing in a coherent dynamic flow pattern.

In some embodiments, the first and second structures are disposed in a manner such that the first flow pattern comprises a fuel gas vortex, and the second flow pattern comprises an exhaust gas vortex. In some of these embodiments, the fuel gas vortex travels inside of the exhaust gas vortex.

In some embodiments, the reactor also includes a stimulation coil that is configured to apply an external ionization field to at least a portion of the fuel stream. In addition, the reactor can also include an energy pickup coil that is configured to receive electrical energy from the fuel stream, the exhaust gas stream, or an action of the wave guide.

In addition to the reactor, the pre-ignition fuel treatment system of some embodiments further includes a mechanism that introduces at least 20 weight percentage (wt %) of the fuel stream into the reactor in a vapor state. In these embodiments, the reactor is configured to transform at least some of the fuel stream from the vaporized state to a plasma state before delivering the fuel to the engine's combustion chamber.

In some embodiments, the reactor is configured to mix at least a portion of the exhaust gas stream with the at least a portion of the fuel stream to form a mixed stream. In some of these embodiments, at least 10 wt % of the mixed stream is derived from the exhaust gas stream. Alternatively, the fuel stream is entirely separated from the exhaust stream by a barrier.

In another aspect of the invention, a method for improving combustion efficiency for a combustion engine is presented. The combustion engine is designed to combusts a fuel to produce power and an exhaust gas. The method comprises the step of entraining a stream of the fuel to travel downstream through the reactor chamber in a first flow pattern. The method also comprises the step of entraining a stream of the exhaust gas to travel upstream through a reactor chamber in a second flow pattern. wherein at least one of the first and second flow patterns comprises a structured turbulent flow.

In some embodiments, the method further comprises the step of applying an external ionization field to at least a portion of the fuel stream.

In addition, the method of some embodiments further comprises the step of receiving the fuel stream at the reactor chamber, where at least 50 wt % of the fuel stream is in a vaporized state. The method comprises the step of transforming the fuel stream from the vaporized state to a plasma state. The method also comprises the step of directing the transformed fuel stream to the engine's combustion chamber.

In some embodiments, the method also comprises the step of mixing at least a portion of the fuel stream with at least a portion of the exhaust gas stream. In some of these embodiments, the method also comprises passing the fuel stream past the exhaust gas stream as counter-rotating vortices.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIGS. 3A-3C illustrate example flow patterns induced by a wave guide of some embodiments.

FIG. 4 depicts an example of a "pinecone" arrangement of surface features and charges on a wave guide.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventive subject matter provides apparatus, systems and methods in which a fuel is being treated before ignition in a combustion engine in order to improve fuel efficiency of the engine. In one aspect of the invention, a pre-ignition fuel treatment system for an engine is presented. The system includes a reactor that passes a stream of the exhaust gas past a stream of the fuel. The reactor includes a first structure that entrains the fuel stream to travel in a first flow pattern. The reactor also includes a second structure that entrains the exhaust gas stream to travel in a second flow pattern, wherein at least one of the first and second flow patterns comprises a coherent-structured turbulence.

Figure 1:
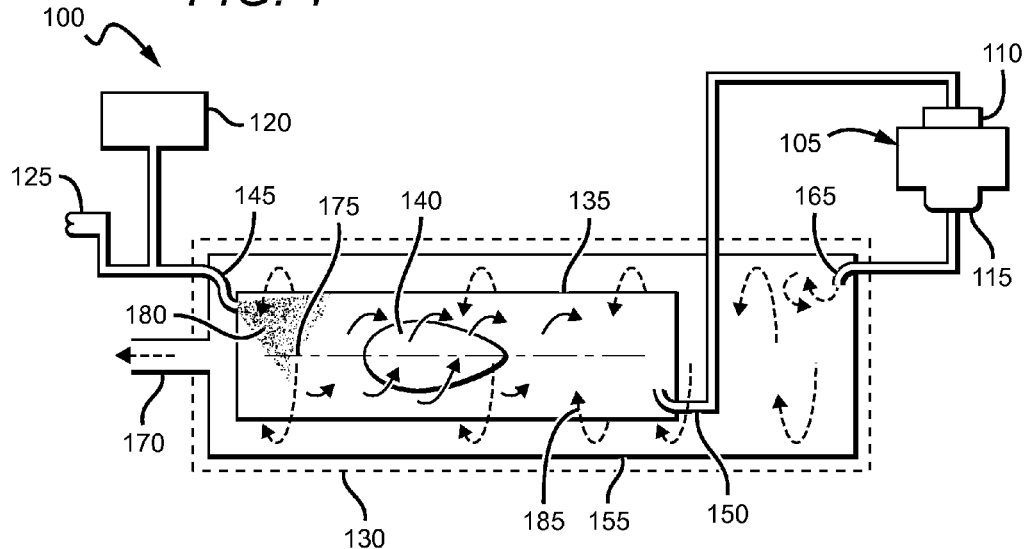
FIG. 1 is a schematic of an engine having a pre-ignition fuel treatment system.

FIG. 1 illustrates an example of a pre-ignition fuel treatment system 100 according to an aspect of the invention. As shown, the pre-ignition fuel treatment system 100 includes a fuel tank 120, an air intake device 125, a reactor unit 130, and a combustion engine 105.

The combustion engine 105 has an intake manifold 110 and an exhaust manifold 115. In some embodiments, the combustion engine 105 is designed to combust fuel (e.g., hydrocarbon fuel such as gasoline, etc.) and air mixture that comes through the intake manifold to produce power and an exhaust gas (e.g., carbon dioxide, etc.).

The workings of a combustion engine that turns chemical energy stored within fuel and oxygen into thermal energy is well known in the art, and will not be described in detail here. In short, the engine 105 allows an amount of fuel and air (with oxygen) mixture into a combustion chamber of the engine 105 via the intake manifold 110. The engine 105 then ignites the fuel-air mixture to initiate the combustion process. The fuel and air turns into very high temperature and high pressure gas, which expands to drive the moving parts (e.g., pistons) of the engine 105. The by-products of the combustion process, such as carbon dioxide, are collectively referred to as exhaust gas. The engine 105 then releases the exhaust gas from the chamber into the exhaust manifold 115.

In FIG. 1, the fuel tank 120 and the air intake 125 are connected to the engine through the reactor unit 130. In some embodiments, the fuel from the fuel tank and air from the air intake are merged to form a fuel/air mixture before entering into the reactor unit 130. In addition, the pre-ignition fuel treatment system 100 of some embodiments includes a mechanism (not show in the figure) that converts at least some of the fuel into vapor form before mixing with the air and entering into the reactor unit 130. In some embodiments, at least 20 wt % of the fuel entering into the reactor unit 130 is in vapor form (e.g., vaporized fuel 180).

The reactor unit 130 of some embodiments is configured to treat the fuel/air mixture before sending the fuel/air mixture to the engine 105. As shown, the reactor unit 130 of some embodiments comprises a reactor housing 135 through which the stream of fuel/air mixture flows through before reaching the intake manifold 110 of the engine 105, and a wave guide 140 located within the reactor housing 135.

Studies have shown that the ionization of the fuel before combustion allows the fuel to combust more efficiently, as disclosed in U.S. Pat. No. 7,487,764 to Lee entitled "Pre-ignition Fuel Treatment System", filed Aug. 10, 2007 (hereinafter "Lee"). Thus, according to some embodiments of the invention, the reactor unit 130 includes one or more ionization devices (not shown in the figure) for applying an ionization field to at least a portion of the fuel.

To facilitate the ionization of the fuel, the reactor unit 130 includes ionization catalysts in the reactor housing 135. Suitable catalyst elements include iron (Fe), titanium (Ti), nickel (Ni), palladium (Pd), platinum (Pt), Copper (Cu), Zinc (Zn), and Chromium (Cr). These elements under high temperature conditions become oxidized, which can act as catalysts in the ionization process. These catalysts can be placed on the surface of the wave guide 140 or along the inner wall of the reactor housing 135.

To further facilitate the ionization process, the reactor unit 130 can also include a stimulation coil (not shown in the figure) in the reactor housing 135 to apply an external ionization field to at least a portion of the fuel that passes through the reactor housing 135. In some embodiments, the stimulation coil can be placed inside of the reactor housing 135 or around the reactor housing 135.

Figure 2A:
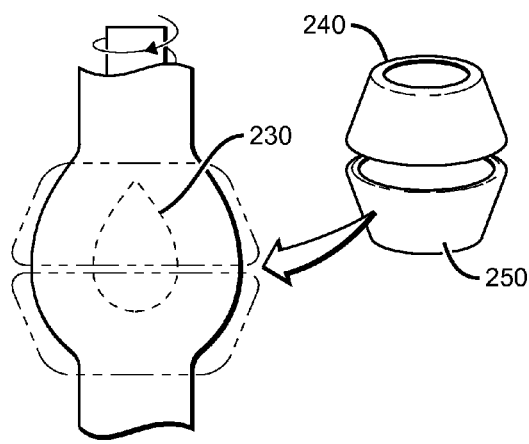
FIGS. 2A-2B illustrate example stimulation coils of some embodiments.
Figure 2B:
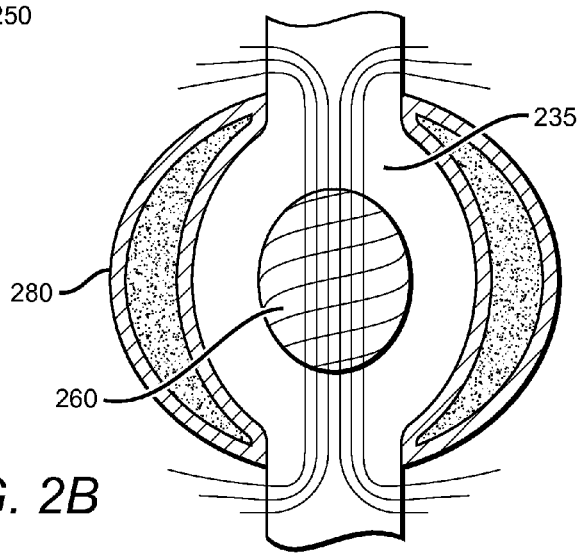

FIG. 2A and FIG. 2B illustrate examples of suitable stimulation coil configurations. In FIG. 2A an upper coil 240 and a lower coil 250 encase the wave guide 230 in a clamshell configuration. FIG. 2B shows an embodiment that utilizes a single, toroidal stimulation coil 280 that surrounds a wave guide 260 within a reactor housing 235.

To even further facilitate the ionization process, the reactor unit 130 can include a magnetic or diamagnetic material as the core of the wave guide 140. In some embodiments, the wave guide 140 is rotatable around an axis (such as axis 175 in FIG. 1) that is parallel to the elongated length of the reactor housing 135. In these embodiments, rotational movement of the waveguide 140 generates an electromagnetic field. Additionally, as the ionized fuel molecules move around/along the wave guide, they further magnetize the wave guide 140. As the wave guide accelerates in its rotation, and its magnetic field is strengthened, the wave guide 140 further ionizes the fuel molecules.

The faster motion of the fuel molecules in turn strengthens the magnetization of the wave guide 140. Thus, the ionized fuel molecule and the wave guide 140 create a positive feedback loop that eventually drives at least some of the fuel into a plasma state. Accordingly, the reactor unit 130 turns at least some of the fuel from the liquid/vapor state into a plasma state before delivering the fuel/air mixture to the engine 105.

One purpose of this ionization process is to ionize as many fuel molecules within the reactor unit 130 as possible (and converting them into plasma state) before delivering the fuel to the engine 105. When the fuel/air mixture passes through the reactor housing 135 in a laminar flow, only a portion of the fuel molecule can be in contact with the catalyst on the wave guide 140 or the catalyst on the inner wall of the reactor housing 135. It is contemplated that entraining the fuel/air mixture stream to travel through the reactor housing 135 in a flow form that comprises a coherent-structured turbulence allows more fuel molecules to contact the catalysts on the wave guide 140 and the inner wall of the reactor housing 135. In addition, the coherent-structured turbulence flow form also forces the fuel/air mixture to be exposed to the catalysts for a longer period of time than they would otherwise if they were to travel in a laminar fashion. It has been shown that these two factors dramatically increase the ionization level of the fuel molecules.

Different embodiments provide different implementations to induce the fuel/air mixture to travel in a coherent-structured turbulence flow form. In some embodiments, the reactor unit 130 can include a wave guide 140 in a specific shape (e.g., a rod, an egg shape, a sphere, or an ellipsoid) that would induce the coherent-structured turbulence flow form. In addition, the wave guide 140 can include a pattern of features on its surface (i.e., to have a surface topology) to induce the fuel/air mixture to flow through the reactor housing in a coherent-structured turbulence flow form. Features that can be selected to be used on the wave guide's surface include, but not limited to, bumps, dimples, cavities, ridges, grooves, and wedges.

In some of these embodiments, the surface topology of the wave guide 140 is configured to induce a rotating movement within the flow form. In some embodiments, the surface topology is configured to induce micro-rotations within the flow form. Further, the surface topology can also be configured to induce vortices within the flow form. These rotating movements, micro-rotations, and vortices can add to improve the ionization of the fuel molecules.

It is also contemplated that wave guide designs that emulate biological systems (e.g. pine cones, conifer scales and bracts, seashells, etc.) can be very effective in inducing coherent-structured turbulences. Thus, in some embodiments, it is contemplated that the wave guide 140 can include scales, tiles, or horns (collectively referred to as "scales") on the surface to induce structured turbulences. In some of these embodiments, the scales are disposed on the wave guide's surface in a coniferous ovulate cone pattern.

FIGS. 3A, 3B, and 3C illustrate example flow patterns induced by a wave guide 300 of some embodiments. As shown, the wave guide 300 contain scales on its surface that emulate the scales on a coniferous ovulate cone. The multiple arrows that go in and out of the scales represent example flows of a fuel/air mixture when the mixture encounters the wave guide 300. As shown, the scales on the wave guides can effectively induce rotating movements, and sometimes, micro-rotation movements as the fuel/mixture flows pass the wave guide. In some embodiments, these rotating movements and micro-rotation movements create the coherent-structured turbulence within the reactor housing 135 of the reactor unit 130. FIG. 3C shows a detailed illustration of an example flow of fuel/air mixture when the mixture passes by scale 305 and 310 of the waveguide 300.

Figure 10:
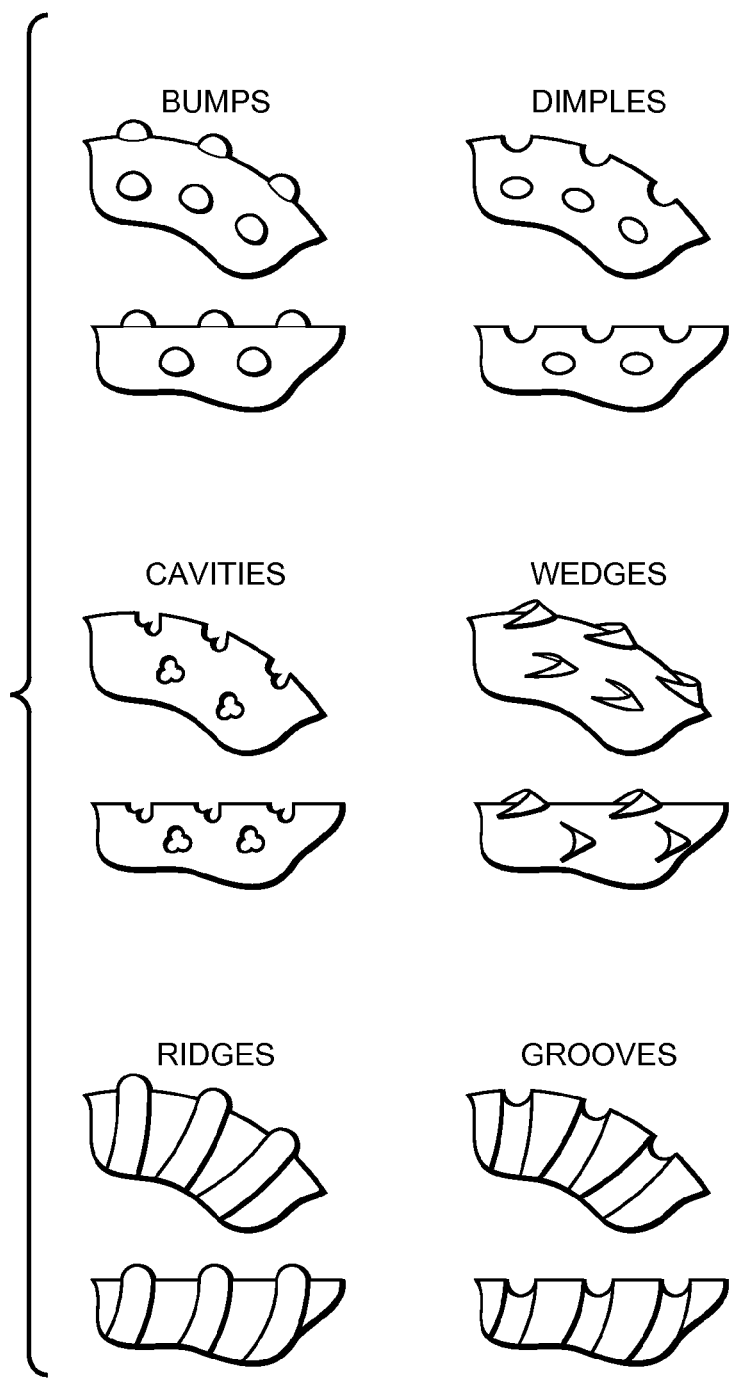
FIG. 10 illustrates examples of surface features of some embodiments.

To further facilitate the flow form of the fuel/air mixture, the inner wall of the reactor housing 135 also has a surface topology that induces the coherent-structured turbulence. In some embodiments, similar to the surface topology of the wave guide, the surface topology of the housing's inner wall also has at least one of the following features: bumps, dimples, cavities, ridges, grooves, and wedges. FIG. 10 illustrates examples of these features. In some embodiments, the surface topology of the reactor housing's inner wall and the surface topology of the wave guide are configured to complement each other to promote the coherent-structured turbulence flow form.

Figure 5:
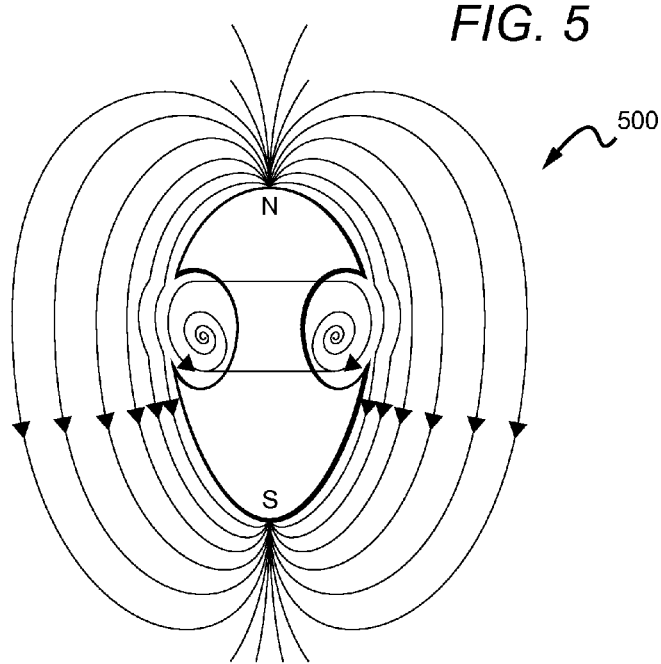
FIGS. 5-6 illustrate example magnetic fields induced by a wave guide of some embodiments.
Figure 6:
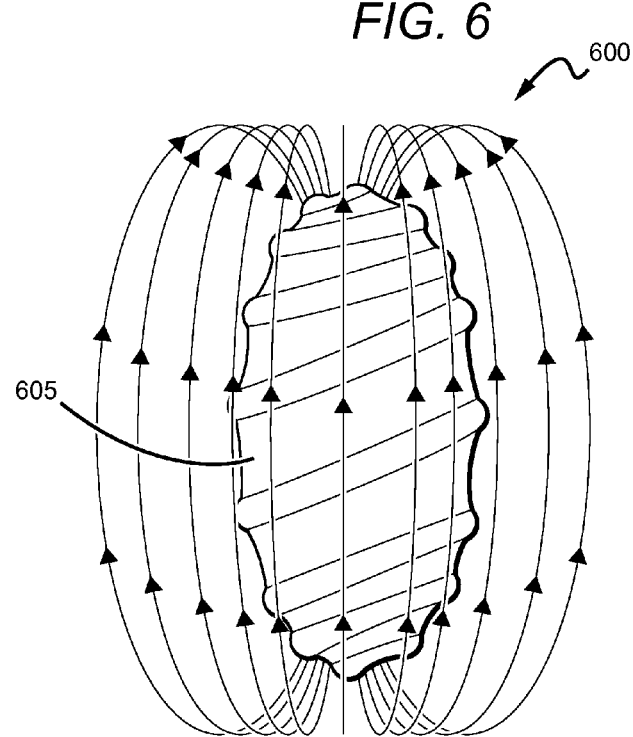

In some embodiments of the inventive concept, surface patterning of the rotatable wave guide can be applied to properties such as electrical charge or magnetic polarity. An example of this is shown in the lower portion of FIG. 4, which shows a wave guide 400 with a floral or "pine cone" pattern of positive 405 and negative 410 charges. Although a floral or pine cone pattern is illustrated, it should be appreciated that other patterns as discussed above can be suitable. Such patterning can be utilized to pattern the flow of magnetic or electric charge responsive species within a flow of fuel/air mixture. Alternatively, such patterning of electrical or magnetic properties can be utilized to enhance the modification (for example the ionization or "cracking") of species within a flow of fuel/air mixture passing over the patterned surface. In some embodiments, the wave guide is rotatable FIG. 5 illustrates an egg-shaped wave guide 500 that is also a source of a magnetic field. The arrows shown in this figure illustrate the direction of the magnetic field induced by the wave guide 500 that will help ionizing the fuel/air mixture as it passes around the wave guide 400. FIG. 6 illustrates an alternative embodiment of the egg-shaped wave guide. In this figure, the wave guide 600 includes surface pattern 605 for inducing flow patterns of the fuel/air mixture.

Referring back to FIG. 1, the reactor housing 135 has an inlet 145 coupled to the fuel tank 120 and the air intake 125 for receiving the fuel/air mixture, and an outlet 150 coupled to the intake manifold 110 of the engine 105 for sending the treated fuel/air mixture to the engine 105. In some embodiments, the inlet 145 and outlet 150 can also be configured to facilitate the induction of the coherent-structured turbulence flow form of the fuel/air mixture through the reactor unit 130.

Figure 7:
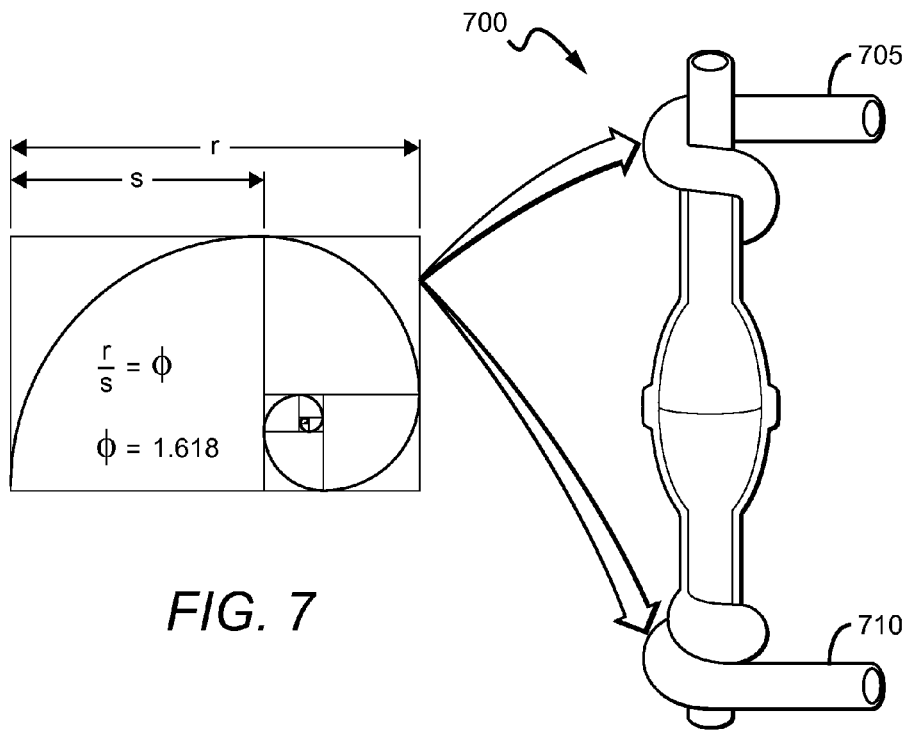
FIG. 7 is a schematic of an inlet chamber having phi-based proportions.

It is contemplated that one or both of the inlet 145 and the outlet 150 have a flow form with phi-based proportions and dimensions. FIG. 7 illustrates an example reactor unit 700 having an inlet 705 and an outlet 710 with a phi-based flow form. As shown, the inlet 705 comprises a curve that conforms to a phi progression that leads the gas into the reactor chamber. It has been long observed that fluids and gasses tend to move in spirals or vortices by nature. These spirals or vortices generally conform to a mathematical progression known as the Golden Mean Ratio, or phi. These motions are well understood to be the most efficient in terms of minimizing waste energy due to friction or drag. More details about the phi progressions of fluids and gasses can be found in the International Publication Number WO2005/003616 to Harman, filed Jun. 29, 2004. The use of these forms and proportions in the inlet 145 and outlet 150 allow for 1) maximization of the thermal and kinetic energy delivered to the reactor unit 130, and 2) imparting helical motion to the gas stream, resulting in a counter-rotational relationship between the exhaust and intake gasses.

It is noted that the ionization of fuel molecules is a highly endothermic reaction, which requires a large amount of heat energy for the ionization to take place. It has been contemplated to use the heat from the exhaust gas as a heat energy source for the reactor unit 130.

Referring back to FIG. 1, the reactor unit 130 includes an exhaust housing 155. As shown, the exhaust housing 155 receives exhaust gas from the exhaust manifold 115 of the engine 105, runs the exhaust through the reactor unit 130, and release the exhaust at the other end of the exhaust housing 155.

As shown in the figure, the exhaust housing 155 of some embodiments encapsulates the reactor housing 135, such that heat from the exhaust gas can be effectively transferred to the fuel/air mixture in the reactor housing 135. To further facilitate the heat transfer from the exhaust gas to the fuel/air mixture, it is contemplated that the exhaust housing 155 of some embodiments can be configured to entrain the exhaust gas to flow in a coherent-structured turbulence flow form (e.g., a coherent dynamic flow pattern, vortices, structured rotations, rotating vortices, etc.). There are many benefits to entraining the exhaust gas to travel within the exhaust housing 155 in a coherent-structured turbulence flow form instead of a laminar form (as described in Lee). One of the benefits is that the rotation flow form forces the exhaust gas to have a longer period of exposure to the reactor housing 135 so that more heat can be transferred from the exhaust gas to the fuel/air mixture. In some studies, this flow form allows the center of the reactor housing 135 to reach a temperature of 450 degrees Celsius, when it appears that existing systems reach a considerably lower temperature.

To induce the coherent-structured turbulence, the inner wall of the exhaust housing 155 includes a pattern of features, such as bumps, dimples, cavities, ridges, grooves, and wedges, that directs the flow of the exhaust gas in a certain flow pattern. FIG. 10 illustrates examples of these features.

As shown in FIG. 1, the exhaust housing 155 has an inlet 165 that directs the exhaust gas into the exhaust housing 155 and an outlet 170 that directs the exhaust gas out of the exhaust housing 155. To further induce the exhaust gas to travel in the coherent-structured turbulence flow form and to create the counter-rotational relationship between the exhaust gas and intake gas, the inlet 165 and the outlet 170 also have flow form with phi-based proportions and dimensions that is similar to the inlet/outlet illustrated in FIG. 7.

The ionized fuel generates a magnetic field as it passes through the reactor unit 130. Similarly, the exhaust gas also generates another magnetic field as it passes through the reactor unit 130. It has been contemplated that interactions between two counter magnetic fields would enhance plasma formation in the fuel. Thus, in some of these embodiments, the exhaust housing 155 and the reactor housing 135 are configured to entrain the exhaust gas and the fuel/air mixture to rotate in opposite directions, as shown by the arrows within the exhaust housing 155 and the arrows within the reactor housing 135, to generate the counter magnetic fields.

Due to a relatively low number of positive ions in the exhaust gas, an ion generator (e.g., an electrode) can be integrated into the pre-ignition fuel treatment system 100 of some embodiments. In some embodiments, the ion generator can either protrude into the reactor chamber and/or the exhaust housing, or are flush mounted, in order to precondition and ionize both intake and exhaust gases.

Figure 8:
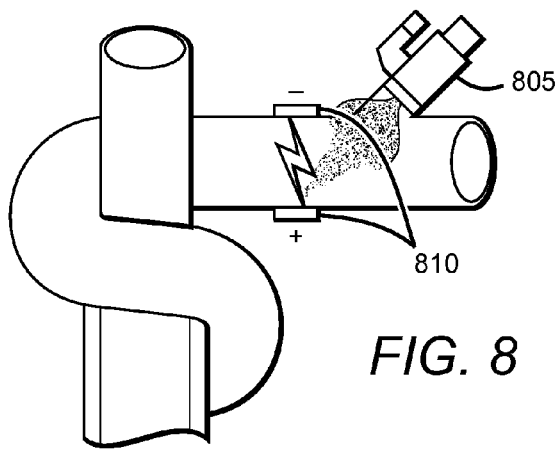
FIG. 8 is a schematic of an ion generator of some embodiments for affecting the exhaust gas stream.

FIG. 8 illustrates an example embodiment of such an ion generator. In this figure, the ion generator comprises a fuel injector 805 and high voltage electrodes 810. The fuel injector 405 injects water mist or other types of fuel into the exhaust gas stream. The electrodes turn the water molecules into ionizing charge carriers, which in turns help ionization of the exhaust gas. Both the fuel injector 805 and the high voltage electrodes 810 can be placed upstream, in the middle, and/or downstream of the reactor unit 130.

In addition to rotation movements, the exhaust housing 155 and the reactor housing 135 are configured to entrain the exhaust gas and the fuel/air mixture to travel in vortices, to further increase the interactions between the magnetic fields and the two streams. Although not shown in this figure, either the fuel/air mixture or the exhaust gas (or both) can flow in other forms of coherent-structured turbulence (e.g., vortices) in addition to the rotation.

Figure 9A:
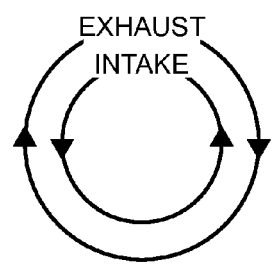
FIGS. 9A-9B are diagrams of relative counter-rotating flows of fuel and exhaust mixtures.
Figure 9B:
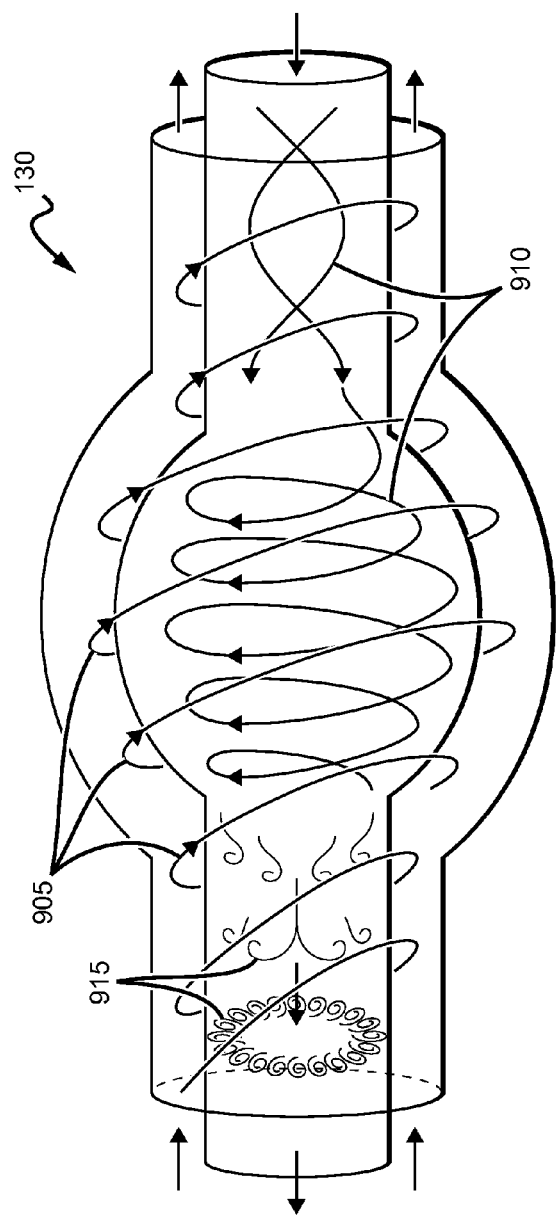

FIGS. 9A and 9B illustrate example flow patterns for the exhaust gas and the fuel/air mixture. Specifically, FIG. 9A illustrates the rotation movements of the exhaust gas and fuel/air mixture viewed from the perspective of a cross-section of the reactor unit. In this example, the exhaust gas travels through the exhaust housing into the drawing and the fuel/air mixture travels through the reactor housing out of the drawing. As shown, the fuel/air mixture rotates within the rotation movement of the exhaust gas. In addition, the fuel/air mixture and the exhaust gas rotate in opposite directions (fuel/air mixture rotates in a counter-clockwise direction while the exhaust gas rotates in a clockwise direction).

FIG. 9B illustrates a three-dimensional simulation of how the exhaust gas and fuel/air mixture flow through the reactor unit 130. As shown, the exhaust gas rotates through the reactor unit at the outset (as shown by arrows 905) while the fuel/air mixture rotates through the reactor unit 130 in the center (as shown by arrows 910). As illustrated by this figure, at least a portion of the fuel/air mixture is induced to flow in micro vortices after passing through the reactor unit 130 (as shown by arrows 915).

It is noted that a charged particle naturally enters a magnetic field and exhibits a helical motion of left or right spin depending on its charge (i.e., positively or negatively charged). In some embodiments, inductive and capacitive coupling can be used to influence the inherent spin of the ions and electrons present in the intake and exhaust of the reactor, which sustain the particles' charge over a longer period. The high proportion of charged particles within both the fuel-air and exhaust streams facilitates the plasma reaction. In some embodiments, the helical motion of the particles is imparted by the magnetic field from the rotating wave guide, the interaction between the rotating wave guide and the fuel/air stream, and the magnetic fields generated by the external stimulation coils.

Being able to modify (enhance or diminish) the inherent instabilities within the plasma field allows "tuning" for a more desirable plasma reaction, leading to greater efficiencies. With an electrostatic field present, longitudinal waves create an ion cyclotron plasma instabilities and with shearing of a two-phase flow with the EGR (in the turbulent interaction of the fuel stream with the EGR), a shear flow velocity is able to create a diocotron instability, which can be seen on the surface flow of the auroras, galactic arms, and pulsars. In some embodiments, the shear flows will be complemented by the surface features of the wave guide and inner walls of the reactor.

More detailed information regarding benefits and effects from counter-rotating charged particles can be found in the following patent literatures: U.S. Pat. No. 2,991,238 to Phillips et al. entitled "Pinched Plasma Reactor", filed Jun. 19, 1958; U.S. Pat. No. 6,548,752 to Pavlenko et al. entitled "System and Method for Generating a Torsion Field", filed Nov. 16, 2001; and U.S. Patent Publication 2012/0223643 to Haramein entitled "Plasma Flow Interaction Simulator", filed Mar. 5, 2012.

Referring back to FIG. 1, it has also been contemplated that the magnetic fields that are generated by the flow of the exhaust gas, the flow of the fuel/air mixture, and the rotation of the waveguide can be converted into power for other usage. Accordingly, in some embodiments, the reactor unit 130 also includes an energy pickup coil (not shown in the figure) that converts magnetic fields into electrical current. In some embodiments, the energy pickup coil and the stimulation coil mentioned above can be the same coil (but not necessarily).

The above examples of the embodiments describe the exhaust gas flows separately in the exhaust gas housing from the fuel/air mixture. In some embodiments, the fuel/air mixture is completely separated from the exhaust gas within the reactor unit by a barrier (e.g., the wall of the reactor housing). However, it is also contemplated that there are some benefits to have at least a portion of the exhaust gas stream to mix with a portion of the fuel/air mixture. The direct interference between the two elements allows more efficient gas exchange. Thus, in some embodiments, the reactor housing wall allows at least a portion of the exhaust gas to pass through from the exhaust housing into the reactor housing (as shown by arrow 185 in FIG. 1). In some embodiments, at least 10 wt % of the mixture within the reactor housing is derived from the exhaust gas stream.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A pre-ignition fuel treatment system for an engine that combusts a fuel to produce power and an exhaust gas, and having a reactor that passes a stream of the exhaust gas past a stream of the fuel, the system comprising:
    a first structure comprising a first housing with an inner wall surface having coherent surface features that entrains the fuel stream to travel in a first flow pattern;
    a second structure comprising a second housing with an inner wall having coherent surface features that entrains the exhaust gas stream to travel in a second flow pattern;
    wherein at least one of the first and second flow patterns comprises a coherent-structured turbulence, and
    wherein the coherent surface features on the inner walls of the first housing have sizes that are substantially large enough to be identified by naked eyes and comprise a pattern of features selected from the group consisting of bumps, dimples, cavities, ridges, grooves and wedges.

2. The system of claim 1 wherein the first structure includes a wave guide having a surface topology comprising a pattern of features, selected from the group consisting of bumps, dimples, cavities, ridges, grooves, and wedges.

3. The system of claim 2 wherein the wave guide has a shape, selected from the list consisting of a rod, an egg, a sphere, and an ellipsoid.

4. The system of claim 2, wherein the wave guide has a surface catalyst comprising an element selected from group consisting of Fe, Ti, Ni, Pd, Pt, Cu, Zn, and Cr.

5. The system of claim 2, wherein the wave guide has a core that includes at least one of a magnetic and a diamagnetic material.

6. The system of claim 2 wherein the pattern of features is configured to induce a rotating movement within the first flow pattern.

7. The system of claim 2 wherein the surface topology is configured to induce micro-rotations within the first flow pattern.

8. The system of claim 2 wherein the surface topology defines a plurality of scales.

9. The system of claim 8 wherein the plurality of scales is disposed in a coniferous ovulate cone pattern.

10. The system of claim 1, wherein the first housing has an inlet and an outlet, and at least one of the inlet and the outlet has a flow form with phi-based proportions and dimensions.

11. The system of claim 1, wherein at least one of the inner and an outer wall of the first housing has a surface catalyst comprising at least one of an element selected from group consisting of Fe, Ti, Ni, Pd, Pt, Cu, Zn, & Cr.

12. The system of claim 1, wherein the second housing has an inlet and an outlet, and at least one of the inlet and outlet have flow form with phi-based proportions and dimensions.

13. The system of claim 1, wherein the coherent surface features on the inner wall surface of the second housing entrains the exhaust gas stream to travel within the second housing in a coherent dynamic flow pattern.

14. The system of claim 1, wherein the first and second structures are disposed such that the first flow pattern comprises a fuel gas vortex, and the second flow pattern comprises an exhaust gas vortex, and fuel gas vortex travels inside of the exhaust gas vortex.

15. The system of claim 1, wherein the reactor further comprises a stimulation coil configured to apply an external ionization field to at least a portion of the fuel stream.

16. The system of claim 1, wherein the reactor further comprises an energy pickup coil configured to receive electrical energy from at least one of the fuel stream, the exhaust gas stream, and an action of the wave guide.

17. The system of claim 1, further comprising a mechanism that introduces at least 20 wt % of the fuel stream into the reactor in a vapor state.

18. The system of claim 17, wherein the reactor is configured to transform at least some of the fuel stream from the vaporized state to a plasma state before delivering the fuel to a combustion chamber of the engine.

19. The system of claim 1, wherein the reactor is configured such that at least a portion of the exhaust gas stream mixes with at least a portion of the fuel stream to form a mixed stream.

20. The system of claim 19, wherein at least 10 wt % of the mixed stream is derived from the exhaust gas stream.

21. The system of claim 1, wherein the fuel stream is separated from the exhaust stream by a barrier.

22. A method of improving combustion efficiency for an engine that combusts a fuel to produce power and an exhaust gas, comprising: entraining a stream of the exhaust gas to travel upstream through a reactor chamber in a first coherent vortical flow pattern;
    entraining a stream of the fuel to travel downstream through the reactor chamber in a second coherent vortical flow pattern that is counter-rotating with respect to the first coherent vortical flow pattern,
    wherein at least one of the first and second flow patterns comprises a structured turbulent flow, and
    wherein the coherent surface features on the inner walls of the reactor have sizes that are substantially large enough to be identified by naked eyes and comprise a pattern of features selected from the group consisting of bumps, dimples, cavities, ridges, grooves and wedges.

23. The method of claim 22, further comprising applying an external ionization field to at least a portion of the fuel stream.

24. The method of claim 22, further comprising:
    receiving the fuel stream at the reactor chamber, wherein at least 50 wt % of the fuel stream is in a vaporized state;
    transforming the fuel stream from the vaporized state to a plasma state; and
    directing the transformed fuel stream to a combustion chamber of the engine.

25. The method of claim 22, further comprising mixing at least a portion of the fuel stream with at least a portion of the exhaust gas stream.

26. The method of claim 22, further comprising mixing at least a portion of the exhaust gas stream mixes with at least a portion of the fuel stream to form a mixed stream.

* * * * *